(12) United States Patent
Raychaudhuri et al.

(10) Patent No.: US 12,049,828 B2
(45) Date of Patent: Jul. 30, 2024

(54) ACTIVE CLEARANCE CONTROL OF FAN BLADE TIP CLOSURE USING A VARIABLE SLEEVE SYSTEM

(71) Applicant: General Electric Company, Schenectady, NY (US)

(72) Inventors: Anusrita Raychaudhuri, Bengaluru (IN); Ravindra Shankar Ganiger, Bengaluru (IN); Bhanu Battu, Bengaluru (IN); Richa Awasthi, Bengaluru (IN); Nilesh Varote, Bengaluru (IN); Vidyashankar Buravalla, Bengaluru (IN)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 17/900,513

(22) Filed: Aug. 31, 2022

(65) Prior Publication Data
US 2024/0018878 A1    Jan. 18, 2024

(30) Foreign Application Priority Data

Jul. 12, 2022  (IN) .............................. 202211040008

(51) Int. Cl.
*F01D 11/20* (2006.01)
*F01D 11/02* (2006.01)
(Continued)

(52) U.S. Cl.
CPC ............ *F01D 11/20* (2013.01); *F01D 11/025* (2013.01); *F01D 11/22* (2013.01); *F01D 11/24* (2013.01);
(Continued)

(58) Field of Classification Search
CPC ........ F04D 29/526; F01D 11/08; F01D 11/14; F01D 11/20; F01D 11/22; F01D 11/24; F02C 7/042; F02C 7/057
(Continued)

(56) References Cited

U.S. PATENT DOCUMENTS 3,227,418 A * 1/1966 West ....................... F01D 11/22
                                                    415/173.1
5,431,533 A * 7/1995 Hobbs ..................... F01D 11/08
                                                    415/58.7
(Continued)

FOREIGN PATENT DOCUMENTS

CN         108374694 A      8/2018
DE    102008007321 A1 *     8/2009  .............. F01D 11/16
(Continued)

OTHER PUBLICATIONS

English translation of DE102008007321A1 (Year: 2009).*

*Primary Examiner* — J. Todd Newton
*Assistant Examiner* — Wesley Le Fisher
(74) *Attorney, Agent, or Firm* — Hanley, Flight & Zimmerman, LLC

(57) ABSTRACT

Variable sleeve clearance control systems for gas turbine engines are disclosed. An example variable sleeve clearance control system for a gas turbine engine includes a sleeve comprising a first end and a second end, the first end of the sleeve coupled to a first spring that biases the sleeve inward, and the second end of the sleeve coupled to a second spring that biases the sleeve outward, a proximity sensor to measure a clearance width, and a controller for each of the first and second springs, the controller to obtain the measured clearance width from the proximity sensor and determine a response of the first and second springs.

19 Claims, 11 Drawing Sheets

(51) Int. Cl.
    *F01D 11/08*     (2006.01)
    *F01D 11/14*     (2006.01)
    *F01D 11/22*     (2006.01)
    *F01D 11/24*     (2006.01)
    *F02C 7/042*     (2006.01)
    *F02C 7/057*     (2006.01)
    *F04D 29/52*     (2006.01)

(52) U.S. Cl.
    CPC ............ *F02C 7/042* (2013.01); *F04D 29/526* (2013.01); *F01D 11/08* (2013.01); *F01D 11/14* (2013.01); *F02C 7/057* (2013.01); *F05D 2220/32* (2013.01); *F05D 2240/11* (2013.01); *F05D 2300/505* (2013.01)

(58) Field of Classification Search
    USPC .................. 415/126, 127, 128, 173.1, 173.2
    See application file for complete search history.

(56) References Cited

U.S. PATENT DOCUMENTS

| | | | |
|---|---|---|---|
| 5,593,277 A | 1/1997 | Proctor et al. | |
| 7,367,776 B2 | 5/2008 | Albers et al. | |
| 7,448,849 B1* | 11/2008 | Webster | F01D 11/22 415/128 |
| 7,686,569 B2 | 3/2010 | Paprotna et al. | |
| 8,186,945 B2* | 5/2012 | Bhatnagar | F01D 11/22 415/173.1 |
| 9,085,992 B2* | 7/2015 | Evans | F04D 29/526 |
| 9,169,741 B2 | 10/2015 | Szwedowicz et al. | |
| 9,963,988 B2* | 5/2018 | Swedowicz | F01D 11/18 |
| 10,082,038 B2* | 9/2018 | Cortequisse | F04D 29/526 |
| 10,415,418 B2* | 9/2019 | McCaffrey | F01D 11/18 |
| 10,801,366 B2* | 10/2020 | Ganiger | F16C 35/042 |
| 2008/0267770 A1* | 10/2008 | Webster | F16J 15/0887 415/173.1 |
| 2010/0303612 A1* | 12/2010 | Bhatnagar | F01D 11/22 415/127 |
| 2012/0248704 A1* | 10/2012 | Fennell | F01D 11/10 277/358 |
| 2013/0034423 A1 | 2/2013 | Adaickalasamy et al. | |
| 2013/0101391 A1* | 4/2013 | Szwedowicz | F01D 11/18 415/12 |
| 2013/0315716 A1* | 11/2013 | Cotroneo | F01D 11/22 415/130 |

FOREIGN PATENT DOCUMENTS

| | | |
|---|---|---|
| EP | 1686243 A2 | 8/2006 |
| EP | 2239423 A1 | 10/2010 |
| EP | 2570615 A1 | 3/2013 |

* cited by examiner

| SLEEVE INCLINATION | AXIAL MOVEMENT, INCH | RADIAL GAP VARIATION, INCH |
|---|---|---|
| 0.20 | 0.10 | 0.0003 |
| 0.50 | 0.10 | 0.0009 |
| 0.75 | 0.10 | 0.0013 |
| 1.00 | 0.10 | 0.0017 |
| 1.50 | 0.10 | 0.0026 |
| 2.00 | 0.10 | 0.0035 |
| 2.50 | 0.10 | 0.0044 |
| 3.00 | 0.10 | 0.0052 |
| 5.00 | 0.10 | 0.0087 |
| 10.00 | 0.10 | 0.0176 |

FIG. 3

ACTIVE CLEARANCE CONTROL OF FAN BLADE TIP CLOSURE USING A VARIABLE SLEEVE SYSTEM

RELATED APPLICATION

This patent claims the benefit of India Patent Application No. 202211040008, which was filed on Jul. 12, 2022. India Patent Application No. 202211040008 is hereby incorporated herein by reference in its entirety. Priority to India Patent Application No. 202211040008 is hereby claimed.

FIELD OF THE DISCLOSURE

This disclosure relates generally to active clearance control mechanisms in gas turbine engines, and, more particularly, to active clearance control of a fan blade tip closure.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section.

In particular configurations, the compressor section includes, in serial flow order, a high pressure (HP) compressor and a low pressure (LP) compressor. Similarly, the turbine section includes, in serial flow order, a high pressure (HP) turbine and a low pressure (LP) turbine. The HP compressor, LP compressor, HP turbine, and LP turbine include a one or more axially spaced apart rows of circumferentially spaced apart rotor blades. Each rotor blade includes a rotor blade tip. One or more shrouds may be positioned radially outward from and circumferentially enclose the rotor blades.

BRIEF DESCRIPTION OF THE DRAWINGS

A full and enabling disclosure of the present disclosure, including the best mode thereof, directed to one of ordinary skill in the art, is set forth in the specification, which makes reference to the appended Figures, in which:

FIG. 3 depicts an example sleeve angle of inclination table for the variable sleeve clearance control system of FIG. 2.

Figure 1:
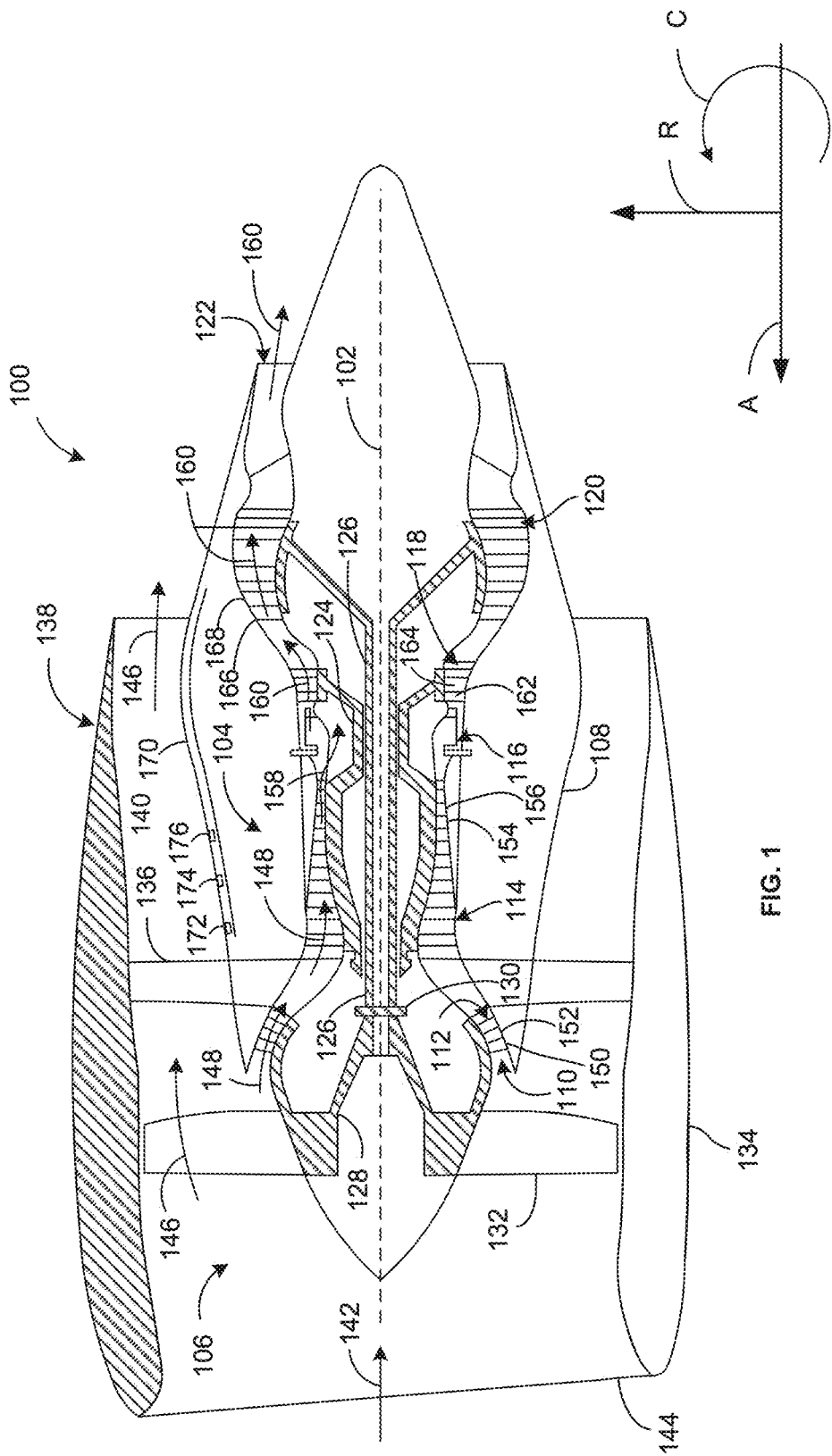
FIG. 1 illustrates a cross-sectional view of a gas turbine engine.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, joined, detached, decoupled, disconnected, separated, etc.) are to be construed broadly and may include intermediate members between a collection of elements and relative movement between elements unless otherwise indicated. As used herein, the term "decouplable" refers to the capability of two parts to be attached, connected, and/or otherwise joined and then be detached, disconnected, and/or otherwise non-destructively separated from each other (e.g., by removing one or more fasteners, removing a connecting part, etc.). As such, connection/disconnection references do not necessarily infer that two elements are directly connected and in fixed relation to each other. Stating that any part is in "contact" with another part means that there is no intermediate part between the two parts.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Known clearance control systems for fan blades within gas turbine engines include materials that provide a physical deflection response when a load is applied (e.g., when a blade comes into contact with a casing, shroud, etc.). Example clearance control systems disclosed herein utilize a spring-driven actuation mechanism wherein the clearance is actively monitored and adjusted through use of a sleeve having a variable angle of inclination. In some examples, the variable sleeve clearance control system is configured to narrow a clearance (e.g., a clearance between the fan blade and fan casing) when aircraft cruise conditions cause the fan blade to retract away from the fan casing, promoting optimal engine performance. Additionally, example variable sleeve clearance control systems disclosed herein include a series of compression and/or leaf springs, which further assist the control mechanism in widening/narrowing the clearance in response to flight conditions. Examples disclosed herein may additionally include proximity sensors to actively monitor fan blade expansion and/or retraction to drive the electromagnetically-actuated clearance control system response.

Known blade tip loss mitigation systems in gas turbine engines have a primary goal of widening the clearance between the blade and fan casing to prevent frequent physical contact between the two materials. However, maintaining a wide clearance between the fan blade and fan casing results in decreased engine performance over time. Example variable sleeve clearance control systems disclosed herein include a sleeve configured to slide (e.g., linearly) back and forth to narrow and/or widen the clearance in response to flight conditions. In some examples, the sleeve is configured to have a variable angle of inclination. Additionally, example assemblies disclosed herein include a set of proximity sensors and springs to facilitate a clearance control response of the variable sleeve clearance control system.

Various terms are used herein to describe the orientation of features. As used herein, the orientation of features, forces and moments are described with reference to the yaw axis, pitch axis, and roll axis of the vehicle associated with the features, forces, and moments. In general, the attached figures are annotated with reference to the axial direction, radial direction, and circumferential direction of the gas turbine associated with the features, forces, and moments. In general, the attached figures are annotated with a set of axes including the roll axis R, the pitch axis P, and the yaw axis Y. As used herein, the terms "longitudinal," and "axial" are used interchangeably to refer to directions parallel to the roll axis. As used herein, the term "lateral" is used to refer to directions parallel to the pitch axis. As used herein, the term "vertical" and "normal" are used interchangeably to refer to directions parallel to the yaw axis.

In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, etc.). As used herein, the term "linkage" refers to a connection between two parts that restrain the relative motion of the two parts (e.g., restrain at least one degree of freedom of the parts, etc.). "Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Many gas turbine engine architectures include fan casings circumferentially enclosing the rotor blades of the engine. The proximity of the rotor blades to the casing results in frequent physical contact between the blades and casing, particularly when flight conditions cause the fan blades to expand and come into contact with the casing, causing eventual blade tip loss.

Examples disclosed herein are intended to overcome the above-referenced deficiencies by incorporating a sleeve coupled to a controller (e.g., set of controllers) and/or proximity sensor (e.g., set of proximity sensors) to act as a clearance control system (referred to herein as a variable sleeve clearance control system). The variable sleeve clearance control system, in examples disclosed herein, allows for a narrowing and/or widening of the clearance between the blades and casing, in response to an expansion and/or retraction of the fan blades based on flight conditions (e.g., the expansion and/or retraction monitored by the proximity sensors). The importance of this clearance control system is illustrated, for example, by preventing blade tip loss when a rotor blade rubs against the fan casing. The sleeve, in conjunction with abradable materials, compression and/or leaf springs, controllers, and/or proximity sensors, allows for the dynamic mitigation of blade tip loss as flight conditions change, and acts an active clearance control system. Furthermore, the sleeve is configured to have a variable angle such that when actuated (e.g., by the controllers) in response to a determination (e.g., by the proximity sensors) that the clearance has widened beyond a measure that would negatively affect overall engine performance and/or efficiency, the sleeve will effectively narrow the clearance to improve engine performance.

Referring now to the drawings, wherein identical numerals indicate the same elements throughout the figures, FIG. 1 is a schematic cross-sectional view of an example turbofan-type gas turbine engine 100 ("turbofan 100"). As shown in FIG. 1, the turbofan 100 defines a longitudinal or axial centerline axis 102 extending therethrough for reference. In general, the turbofan 100 may include a core turbine 104 or gas turbine engine disposed downstream from a fan section 106.

The core turbine 104 generally includes a substantially tubular outer casing 108 ("turbine casing 108") that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 may also couple to a fan spool or shaft 128 of the fan section 106 ("fan shaft 128"). In some examples, the LP shaft 126 may couple directly to the fan shaft 128 (i.e., a direct-drive configuration). In alternative configurations, the LP shaft 126 may couple to the fan shaft 128 via a reduction gearbox 130 (e.g., an indirect-drive or geared-drive configuration).

As shown in FIG. 1, the fan section 106 includes a plurality of fan blades 132 coupled to and extending radially outwardly from the fan shaft 128. An annular fan casing or nacelle 134 circumferentially encloses the fan section 106 and/or at least a portion of the core turbine 104. The nacelle 134 is supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbofan 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 in which one or more sequential stages of HP turbine stator vanes 162 and HP turbine rotor blades 164 coupled to the HP shaft 124 extract a first portion of kinetic and/or thermal energy from the combustion gases 160. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the turbofan 100, the core turbine 104 serves a similar purpose and sees a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) may be included between any shafts and spools. For example, the reduction gearbox 130 may be disposed between the LP shaft 126 and the fan shaft 128 of the fan section 106. FIG. 1 further includes a cowling 170 and offset-arch gimbals 172, 174, 176. The cowling 170 is a covering which may reduce drag and cool the engine. The offset-arch gimbals 172, 174, 176 may, for example, include infrared cameras to detect a thermal anomaly in the undercowl area of the engine 100.

Figure 2:
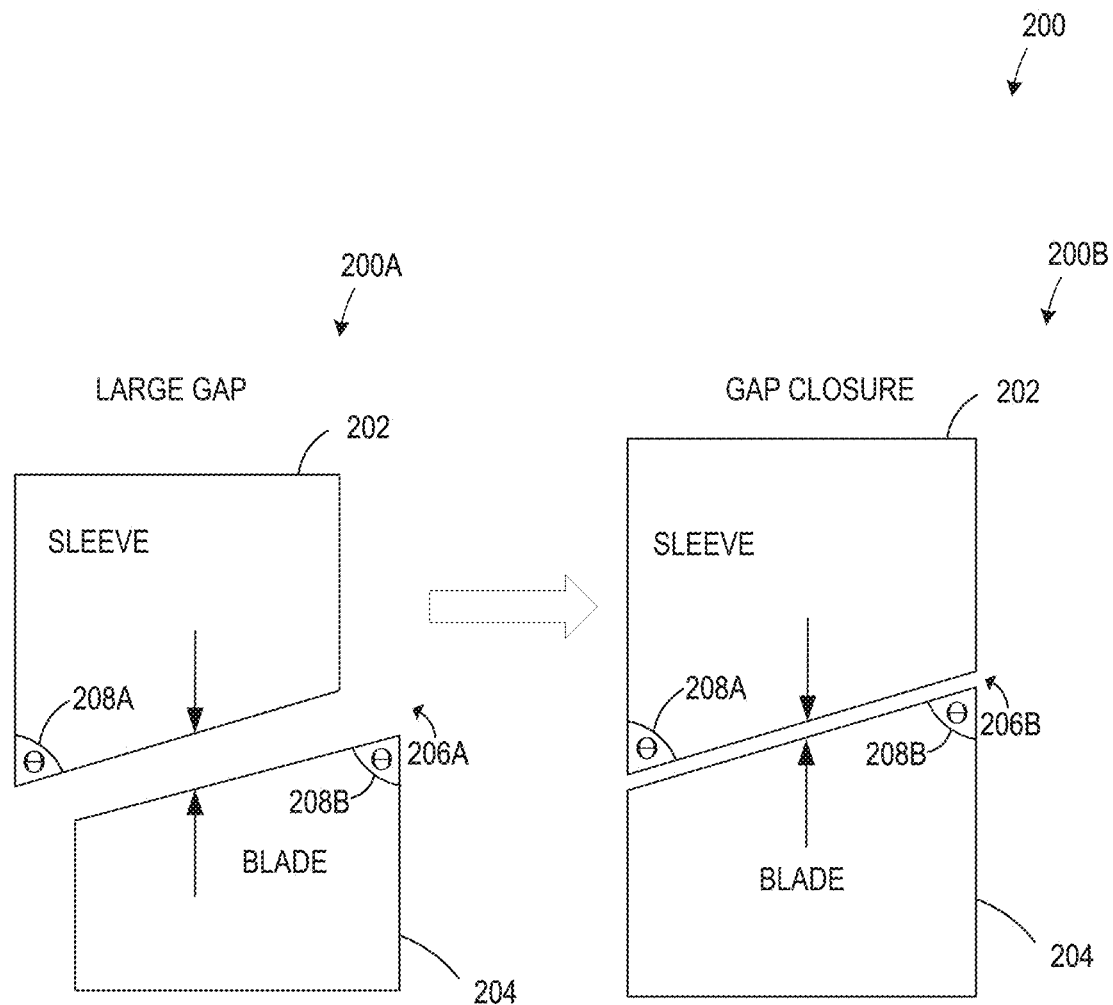
FIG. 2 depicts an example variable sleeve clearance control system.

FIG. 2 depicts an example variable sleeve clearance control system 200, implemented in accordance with the teachings of this disclosure. The example variable sleeve clearance control system 200 includes an example variable sleeve 202, an example fan blade 204, and an example clearance (e.g., wide clearance 206A, narrow clearance 206B). An example first sleeve state 200A depicts a wide clearance 206A with the sleeve 202 shifted to the left in relation to the fan blade 204. An example second sleeve state 200B depicts a narrow clearance 206B with the sleeve 202 centered in relation to the fan blade 204. In examples disclosed herein, the angle of inclination 208A of the variable sleeve 202 (e.g., 6') may be calculated using the example equation, $\tan(\theta)=\text{perpendicular/base}$.

In examples disclosed herein, the variable sleeve 202 can be characterized by one or more of a brush seal, composite, hollow, perforated, and/or honeycomb style design. The soft material (e.g., abradable material 606 of FIG. 6) of the variable sleeve 202 is configured to mitigate potential damage to the example fan blade 204 upon contact with the example fan case 402 of FIG. 4 at certain flight conditions. Additionally, in examples disclosed herein, the example fan blade 204 may be any type of hollow aluminum-lithium blade, characterized by contraction and/or expansion in response to flight conditions (e.g., ambient temperature). The contraction and/or expansion of the fan blade 402 contributes to changes in clearance between the fan blade 204 and the fan case 402 of FIG. 4 (e.g., wide clearance 206A, narrow clearance 206B). For example, at colder ambient temperatures (e.g., during cruise), the fan blade 204 may contract, causing the wide clearance 206A, which negatively impacts engine performance. To mitigate loss of engine efficiency, the variable sleeve clearance control system 200 causes the example variable sleeve 202 to shift (e.g., axially, radially, etc.) to reduce the width of the clearance (e.g., narrow clearance 206B). In examples disclosed herein, the variable sleeve 202 includes a bottom end positioned at an angle of inclination 208A relative to a tip angle 208B of the fan blade 204. In some examples, the angle of inclination 208A and the tip angle 208B may be at least similar or equal in value.

Furthermore, in examples disclosed herein, the variable sleeve 202 is configured to shift axially (e.g., left/right on an axis perpendicular to the fan blade 204) to widen and/or narrow the clearance (e.g., wide clearance 206A, narrow clearance 206B). However, in other examples, the variable sleeve 202 may be configured to shift radially (e.g., up/down on an axis perpendicular to the fan case 402 of FIG. 4). In these examples, the variable sleeve clearance control system 200 causes the variable sleeve 202 to shift radially outward (e.g., away from the fan blade 204) in response to an indication (e.g., by a proximity sensor 410 explained further in conjunction with FIG. 4) that the clearance (e.g., clearance 206 of FIG. 4) has narrowed beyond an acceptable range (e.g., narrow clearance 206B). Similarly, the variable sleeve clearance control system 200 may cause the variable sleeve 202 to shift radially inward (e.g., towards the fan blade 204) in response to an indication (e.g., by the proximity sensor 410 of FIG. 4) that the clearance has widened beyond an acceptable range (e.g., wide clearance 206A).

FIG. 3 depicts an example angle of inclination table 300 for the variable sleeve clearance control system 200 of FIG. 2. The example angle of inclination table 300 includes example sleeve inclination values 302, example axial movement values 304, and example radial gap variation values 306. For each of the example sleeve inclination values 302, the angle of inclination table 300 shows a corresponding set of values of the axial movement values 304 and radial gap variation values.

In examples disclosed herein, the axial movement values 304 represent values of movement parallel to the direction of motion in relation to the given angle value of the sleeve inclination values 302, and the radial gap variation values 306 represent values of movement perpendicular to the direction of motion in relation to the given angle value of the sleeve inclination values 302. Furthermore, in examples disclosed herein the axial movement values 304 represent axial movement (e.g., in inches) of the variable sleeve 202 of FIG. 2. For example, 0.10 inches of axial movement for the variable sleeve 202 may indicate a shift of that amount towards the fan blade 204 (e.g., to the right) or away from the fan blade 204 (e.g., to the left). Additionally, in examples disclosed herein, the sleeve inclination values 302 represent possible values of the angle of inclination 208A of FIG. 2. For example, a value of 0.20 degrees indicates an angle of inclination 208A of the variable sleeve 202 of that size. Furthermore, the radial gap variation values 306 correspond to a width of the clearance (e.g., wide clearance 206A, narrow clearance 206B of FIG. 2) between the fan case 402 of FIG. 4 and fan blade 204 of FIG. 2. For example, a radial gap variation value As shown in the example angle of inclination table 300 of FIG. 3, the radial gap variation values 306 become larger as the sleeve inclination values 302 become larger. In examples disclosed herein, this indicates that as the angle of inclination 208A of the variable sleeve 202 of FIG. 2 increases, with the same axial movement of the variable sleeve 202, the radial gap (e.g., clearance between the fan blade 402 of FIG. 4 and the fan case 204 of FIG. 2) narrows and/or widens to a greater degree to promote engine efficiency and prevent blade tip loss.

Figure 4:
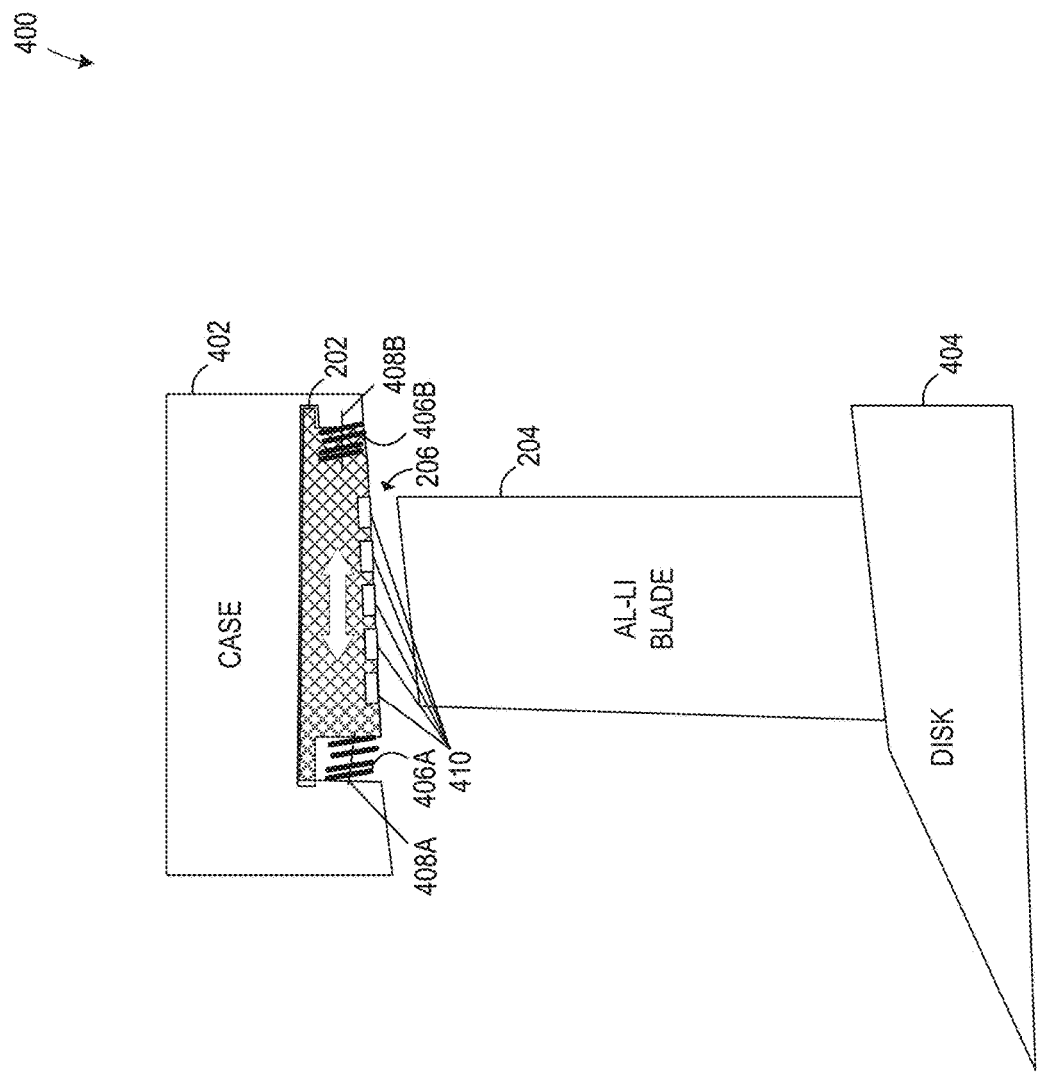
FIG. 4 depicts an example first implementation of the variable sleeve clearance control system of FIG. 2, implemented in accordance with the teachings of this disclosure.

FIG. 4 illustrates an example assembly 400 of the variable sleeve clearance control system 200 of FIG. 2. The example assembly 400 includes an example fan case 402, an example first and/or second controllers 408A, 408B, an example first spring 406A, an example second spring 406B, an example proximity sensor 410 (e.g., set of proximity sensors), and an example disk 404, positioned relative to the variable sleeve 202, the clearance 206, and the fan blade 204 (e.g., aluminum-lithium blade, etc.) of FIG. 2.

The example variable sleeve 202 is positioned within the fan case 402 (e.g., as a floating sleeve). A first end of the variable sleeve 202, shown on the left side of the example of FIG. 4) is coupled to the example first spring 406A, and a second end of the variable sleeve 202 (e.g., shown on the right side of the example of FIG. 4) is coupled to the example second spring 406B.

The example first and second springs, 406A and 406B, respectively, are configured to compress and/or expand in response to a signal received by the first and/or second controllers 408A, 408B. In examples disclosed herein, each of the first and second springs, 406A and 406B, respectively, are Shape Memory Alloy (SMA) springs, meaning they are characterized by thermal activation and/or deactivation through having an Austenitic state (e.g., soft state) in response to an increased ambient temperature (e.g., greater than or equal to 20 degrees Fahrenheit) and a Martensitic state (e.g., stiff state) in response to decreased ambient temperature (e.g., less than 20 degrees Fahrenheit). Additionally, in examples disclosed herein, the SMA springs may be any combination of Nickel-rich Nickel-Titanium (Ni-rich NiTi) springs, or Nickel-Titanium-Iron (NiTiFe) springs. In other examples, the first and/or second springs, 406A and/or 406B, respectively may alternatively be characterized as pneumatic, hydraulic, and/or piezoelectric systems wherein activation (e.g., using hot bleed air, through a power supply, etc.) results in movement (e.g., axial, radial) of the example variable sleeve 202.

Each of the first and second springs, 406A and 406B, respectively, are coupled to a first and second controller 408A, 408B, respectively, which activates and/or deactivates (e.g., causes to compress and/or decompress) any combination of the first and second springs, 406A and 406B in response to a measured clearance 206 width. For example, in examples disclosed herein, activation of any combination of the first and/or second springs, 406A and 406B, respectively, is performed thermally. That is, when any combination of the first and second springs, 406A and 406B, respectively are to be activated, the first and/or second controller, 408A and/or 408B, perform (e.g., through a signal to a power supply, use of hot bleed air, etc.) thermal activation such that ambient temperatures are increased. As a result, the first and/or second springs, 406A and/or 406B, respectively, are heated into an Austenitic state, allowing for decompression (e.g., expansion) of the spring (e.g., first spring 406A, second spring 406B).

Similarly, deactivation of any combination of the first and/or second springs, 406A and/or 406B, respectively, is performed thermally as well. That is, when any combination of the first and/or second springs, 406A and/or 406B, respectively, are to be deactivated, the first and/or second controller, 408A and/or 408B, perform (e.g., through a signal to a power supply, shut down of hot bleed air, etc.) thermal deactivation such that ambient temperatures return to their original state. As a result, the first and/or second springs, 406A and/or 406B, respectively, are cooled into a Martensitic state, allowing for compression of the spring (e.g., first spring 406A, second spring 406B) back to its original state.

In some examples, the first and second springs, 406A and 406B, respectively, may be electromagnetic, and the first and/or second controllers 408A, 408B may activate and/or deactivate a power supply to actuate the springs (e.g., first spring 406A, second spring 406B). In these examples, the power supply is to be turned on and/or off in response to flight conditions in which the fan blade 204 is expanding towards and/or retracting away from the fan case 402. The first and second springs 406A and 406B, respectively, may utilize any materials that are able to respond to magnetization (e.g., caused by the connection or activation of a power supply by the first and/or second controllers 408A, 408B) in these examples. In examples disclosed herein, connection of a power supply to each of the first and second controllers, 408A and 408B, respectively, activates a magnetic field to which the first and/or second spring 406A, 406B, respectively, may respond. Similarly, disconnection of the power supply would result in deactivation of the magnetic field. Additionally, in some examples, the variable sleeve 202 may be configured to include a layer of abradable material (e.g., foil, ring, etc.) to mitigate damage to the fan blade 204 in the event of contact with the variable sleeve 202, fan case 402, etc.

The example proximity sensor 410 may be represented as a set of sensors lining the base of the variable sleeve 202, along the clearance 206, as depicted in the example of FIG. 2. In some examples, the proximity sensor 410 may be coupled (e.g., threadably removably, rigidly, magnetically, etc.) to the base (e.g., the bottom end) of the variable sleeve 202. Additionally, in some examples, the proximity sensor 410 may be an optical sensor that optically measures the width of the clearance 206.

The example proximity sensor 410 actively measures the width of the clearance 206 (e.g., the width between the variable sleeve 202 and the fan blade 204). The first and/or second controllers 408A, 408B obtain measurements taken by the proximity sensor 410 to determine a response of the variable sleeve clearance control system 200. For example, when the proximity sensor 410 readings indicate that the width of the clearance 206 is narrower than an acceptable value, the first controller 408A actuates the first spring 406A to compress and allow the variable sleeve 202 to shift to the left. The second spring 406B, in turn, decompresses to allow movement of the variable sleeve 202 to the left to widen the clearance 206. On the other hand, when the proximity sensor 410 readings indicate that the width of the clearance 206 is wider than an acceptable value (e.g., wide enough to cause deficiencies in engine performance), the second controller 408B actuates the second spring 406B to compress and allow the variable sleeve 202 to shift to the right. The first spring 406A, in turn, decompresses to allow movement of the variable sleeve 202 to the right to narrow the clearance 206.

Figure 5A:
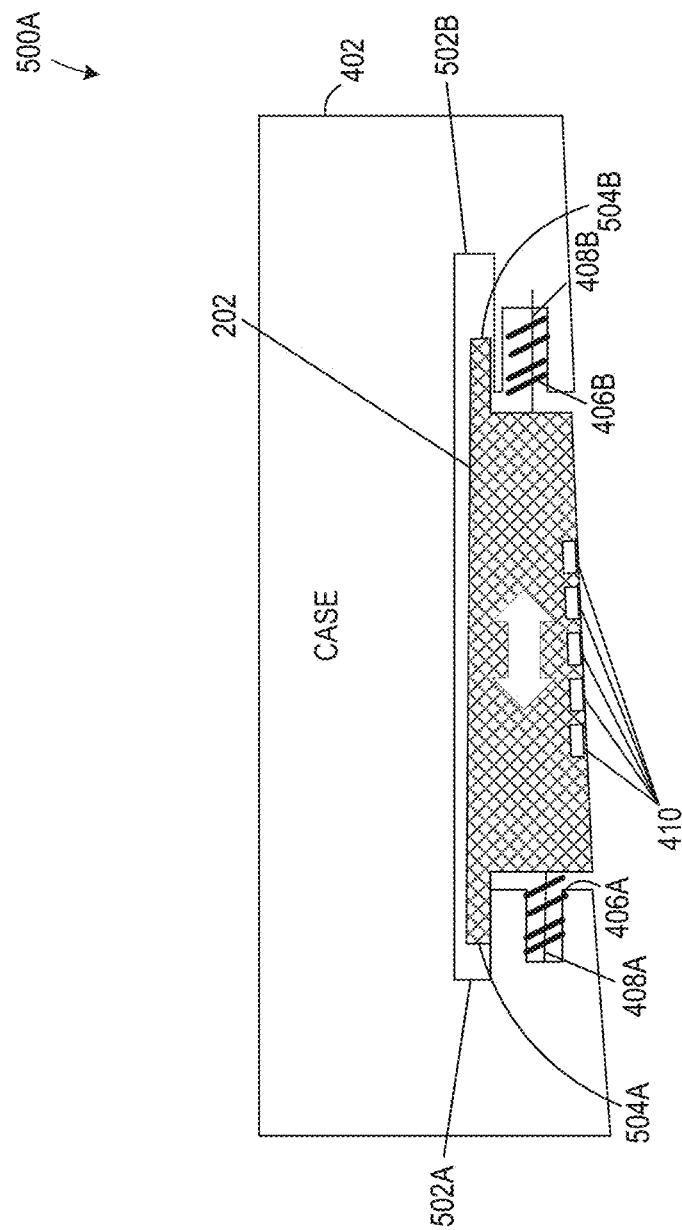
FIGS. 5A and 5B illustrate example second and third implementations of the variable sleeve control system of FIG. 2, implemented in accordance with the teachings of this disclosure.
Figure 5B:
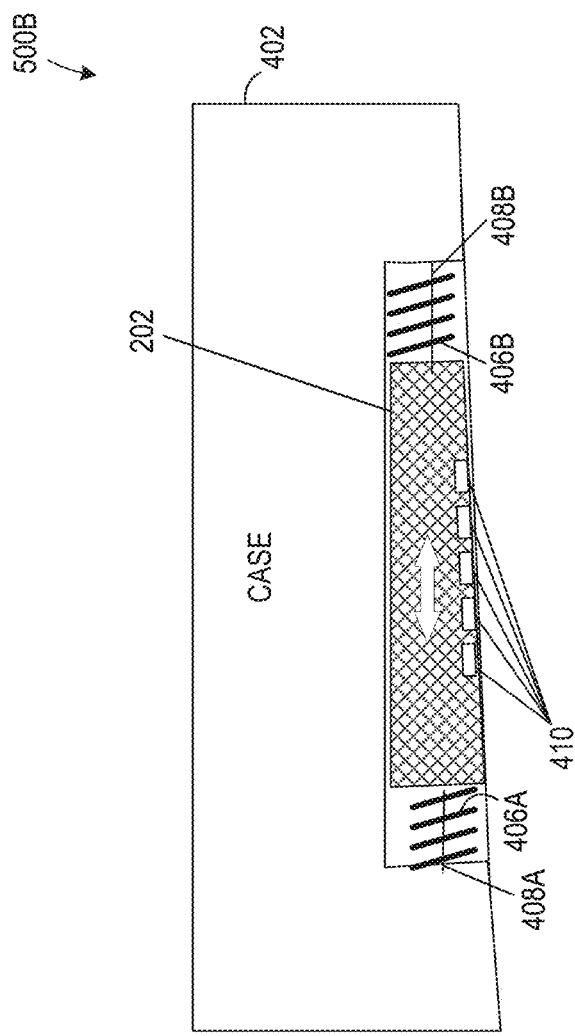

FIGS. 5A and 5B depict example second and third implementations, 500A and 500B, respectively, of the variable sleeve clearance control system 200 of FIG. 2, implemented in accordance with the teachings of this disclosure.

The example second implementation 500A, as shown in FIG. 5A, is substantially similar to the example assembly 400 of FIG. 4, however, the second implementation 500A includes a set of inlets (e.g., a first inlet 502A and a second inlet 502B) for the variable sleeve 202. The example first inlet 502A allows for the positioning of a first arm of the sleeve 504A inside the first inlet 502A, and the example second inlet 502B allows for the positioning of a second arm of the sleeve 504B inside the second inlet 502B. With each of the first and second arms of the sleeve, 504A and 504B, respectively, positioned inside of each of the set of inlets (e.g., the first inlet 502A and the second inlet 502B), the variable sleeve 202 is secured in place to prevent any possible malfunction during movement (e.g., shifting right and/or left along an axis parallel to the fan case 402).

The example third implementation 500B of FIG. 5B includes the variable sleeve 202 with no arms (e.g., the first arm of the sleeve 504A and the second arm of the sleeve 504B of FIG. 5A), floating within the fan case 402, and held in place by the example first and/or second controllers 408A, 408B and first and second springs, 406A and 406B, respectively, of FIG. 4.

Figure 6:
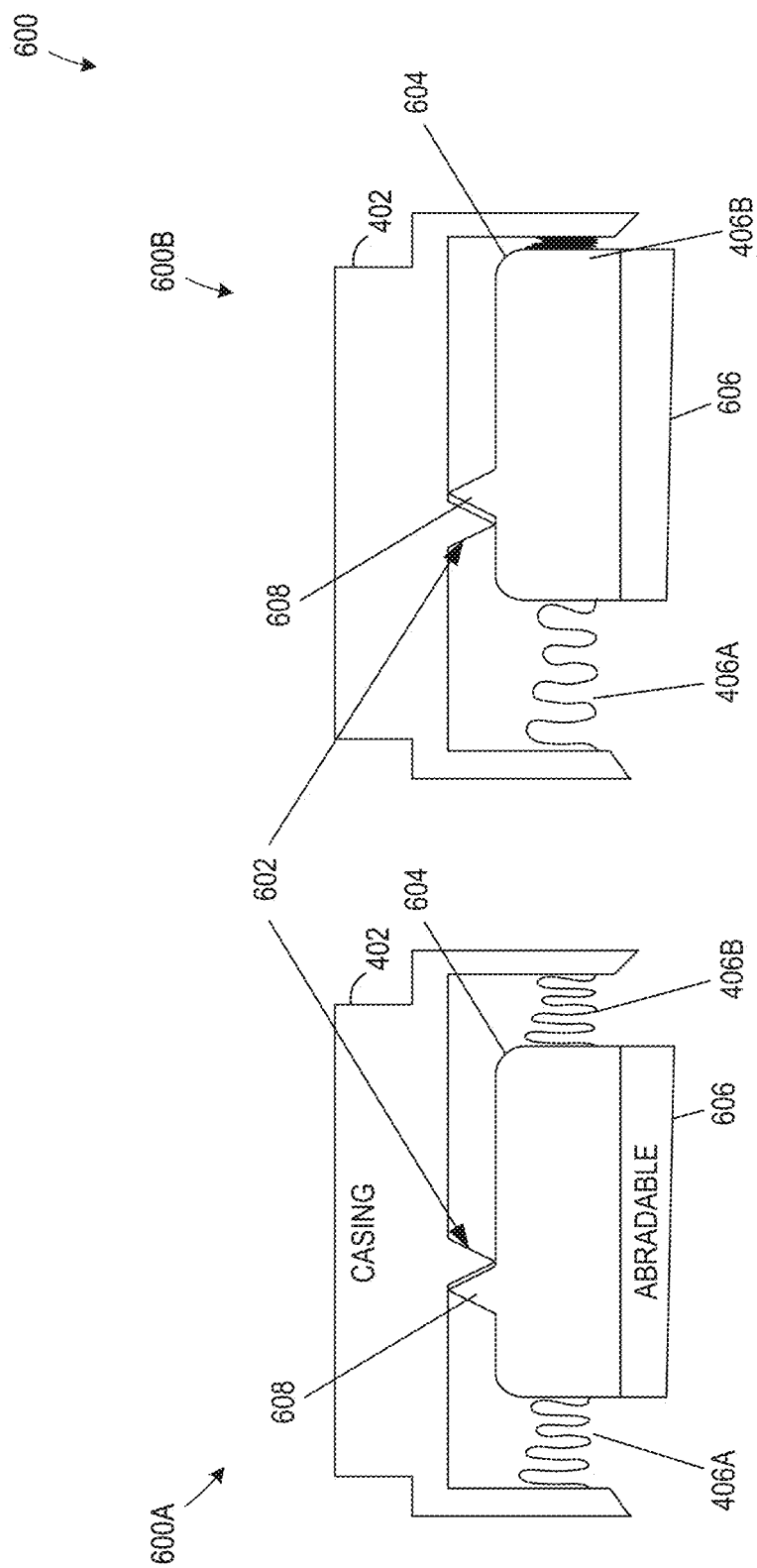
FIG. 6 illustrates an example locking sleeve clearance control system.

FIG. 6 is an illustration of an example locking sleeve clearance control system 600. The example locking sleeve clearance control system 600 includes an example first configuration 600A and an example second configuration 600B, both including an example detent 602, example locking sleeve 604, and example abradable material 606. The example detent 602 is coupled to the fan case 402 and configured to extend radially-downward towards the locking sleeve 604. The locking sleeve 604 is designed to include a protrusion 608 towards the detent 602, such that when the protrusion 608 and detent 602 come into contact, the locking sleeve 604 is unable to move axially beyond the detent 602 (e.g., locked into place). In examples disclosed herein, the detent 602 is coupled in place to the fan case 402 such that it does not move in response to contact (e.g., by the protrusion 608). In some examples, the protrusion 608 of the locking sleeve 604 is positioned such that when it is locked into place by the detent 602, the first spring 406A is fully decompressed, and the second spring 406B is fully compressed. Additionally, the locking sleeve 604 is coupled to the abradable material 606, such that when the locking sleeve 604 moves axially in either direction (e.g., along an axis perpendicular to the fan blade 204), the abradable material 606 moves with the locking sleeve 604. The example locking sleeve clearance control system 600 is especially beneficial in circumstances in which the locking sleeve 604 is to be held in place (e.g., when an aircraft is at ground level, etc.).

The example first configuration 600A depicts the detent 602 positioned axially to the right of the example locking sleeve 604. In this example, when thermally-activated, the first spring 406A decompresses to shift the locking sleeve 604 axially to the right. Once the protrusion 608 of the locking sleeve 604 and the detent 602 engage, the locking sleeve 604 is unable to move further to the right. Similarly, the example second configuration 600B depicts the detent 602 positioned axially to the left of the example locking sleeve 604. In this example, when thermally-activated, the second spring 406B decompresses to shift the locking sleeve 604 axially to the left. Once the protrusion 608 of the locking sleeve 604 and the detent 602 engage, the locking sleeve 604 is unable to move further to the left.

In examples disclosed herein, the location of the detent 604 along the axial span of the fan case 402 determines the position in which the locking sleeve 604 is held in place. In the example of the first configuration 600A, when the detent is positioned more to the left along the axial span of the fan case 402, the range of decompression of the first spring 406A upon thermal activation is reduced. Similarly, the location of the protrusion 608 along the axial span of the locking sleeve 604 further contributes to the position in which the locking sleeve 604 is held in place. In the example first configuration 600A, when the protrusion is positioned more to the left along the axial span of the locking sleeve 604, the range of decompression of the first spring 406A upon thermal activation is greatly reduced.

Figure 7:
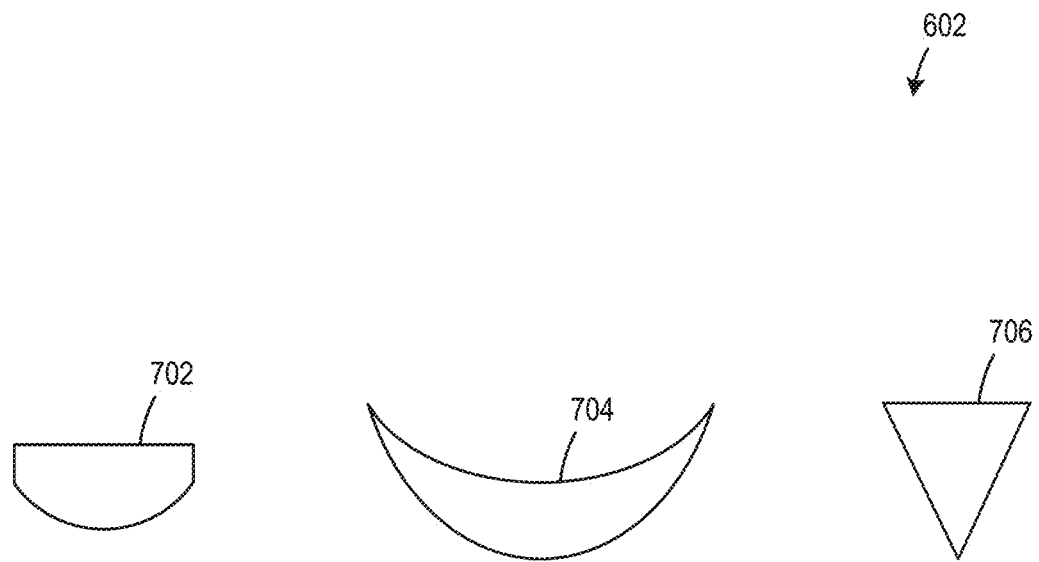
FIG. 7 depicts example detent shapes that may be used to implement the example locking sleeve clearance control system of FIG. 6.

FIG. 7 depicts example shapes of the detent 602 to be used to implement the example locking sleeve clearance control system 600 of FIG. 6, in accordance with the teachings of this disclosure. Any of the first, second, and/or third detent shapes, 702, 704, and 706, respectively, may be used as the detent 602 illustrated in FIG. 6 to hold the locking sleeve 604 in place.

The example first detent shape 702 is characterized by a rounded bottom and flat top edge, the example second detent shape 704 is characterized by both a rounded bottom and rounded top, and the example third detent shape 706 is characterized by a pointed bottom and flat top edge. In examples disclosed herein, the detent 602 (e.g., first detent shape 702, second detent shape 704, third detent shape 706) may be of any shape and/or size, with the protrusion 608 being a complementary shape in order to hold the locking sleeve 604 in place upon contact with the detent 602. In examples disclosed herein, a pointed detent shape (e.g., third detent shape 706) may induce a greater amount of effort (e.g., by the first spring 406A and/or the second spring 406B, etc.) to overcome, thus providing a more rigid locking system wherein the example locking sleeve 604 is unable to move without a great deal of force exerted by any combination of the first and/or second springs, 406A and/or 406B. This may be beneficial in environments wherein ambient temperatures are higher, thus preventing unwanted thermal activation (e.g., of the first and/or second springs, 406A and/or 406B) and movement of the example locking sleeve 604. Similarly, in examples disclosed herein, a rounded detent shape (e.g., first detent shape 702, second detent shape 704) may involve a smaller amount of effort (e.g., by the first spring 406A and/or the second spring 406B, etc.) to overcome, thus providing a more flexible locking system wherein the example locking sleeve 604 is able to move past the example detent 602 with a smaller amount of force exerted by any combination of the first and/or second springs, 406A and/or 406B. This may be beneficial in environments wherein ambient temperatures are lower, meaning unwanted thermal activation (e.g., of the first and/or second springs, 406A and/or 406B) and movement of the example locking sleeve 604 is unlikely.

Figure 8:
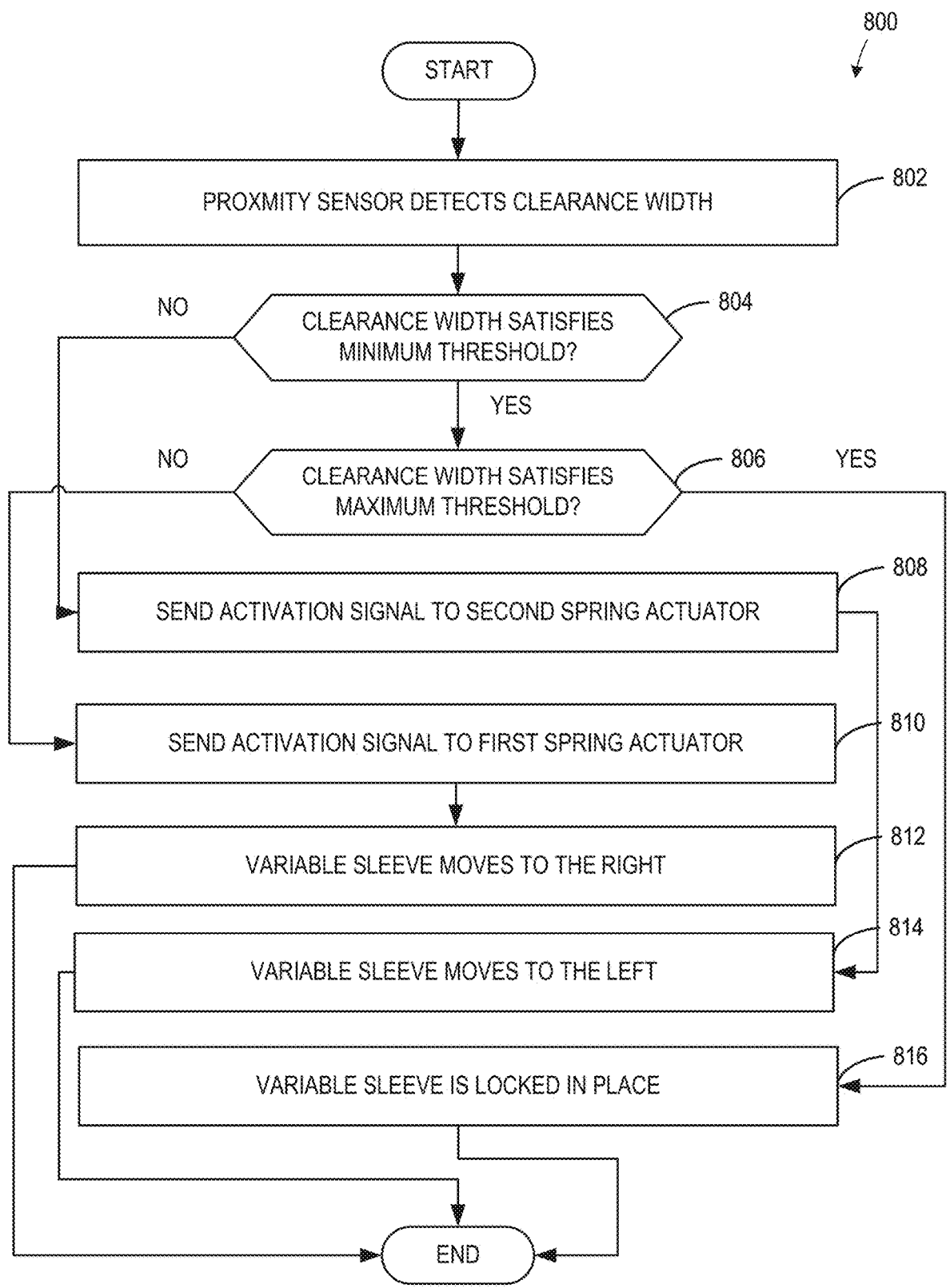
FIG. 8 is a flowchart representing machine-readable instructions to execute the example electromagnetically-actuated clearance control system of FIG. 2.

FIG. 8 is a flowchart representative of example machine readable instructions and/or example operations 800 that may be executed and/or instantiated by processor circuitry and/or the first and/or second controllers 408A, 408B of FIG. 4 to actively monitor widening and/or narrowing of the clearance 206 and provide a response to mitigate blade tip loss and promote optimal engine performance. The machine readable instructions and/or the operations 800 of FIG. 8 begin at block 802, at which the processor circuitry 1012 shown in the example processor platform 1000 discussed below in connection with FIG. 10 causes the proximity sensor 410 to detect the width of the clearance 206.

At block 804, as shown in FIG. 8, the first and/or second controllers, 408A, 408B determine whether the width of the clearance 206, as measured in block 802, is greater than a first threshold (e.g., 0.010 inches, 0.020 inches, 0.030 inches, 0.050 inches, etc.) (e.g., indicating that the clearance 206 satisfies the first threshold value, such as a minimum threshold value). In examples disclosed herein, the first threshold may be a pre-determined value indicating a minimum acceptable width of the clearance 206 to prevent fan blade 204 tip loss and/or tip rub. Additionally, in examples disclosed herein, the width of clearance 206 may be measured in inches, centimeters, and/or any other unit of measurement. When the clearance 206 is determined to not be greater than the first threshold (e.g., the clearance 206 is too narrow to avoid contact with the fan blade 204), the process moves forward to block 808. However, when the clearance 206 is determined to be greater than the first threshold (e.g., the clearance 206 is not determined to be too narrow), the process moves to block 806. Additionally, in examples disclosed herein, example processor circuitry 1012, discussed further in conjunction with FIG. 10, can implement the first and/or second controllers 408A, 408B, which can be used to execute the method.

At block 806, the first and/or second controllers 408A, 408B, establish whether the width of the clearance 206, as measured in block 802, is less than a second threshold value (e.g., 0.005 inches, 0.006 inches, 0.007 inches, 0.008 inches, etc.) (e.g., indicating that the clearance satisfies the second threshold value, such as a maximum threshold value). In examples disclosed herein, the second threshold may be a pre-determined value indicating a maximum acceptable width of the clearance 206 to prevent a reduction of engine efficiency and/or performance. Additionally, in examples disclosed herein, the width of clearance 206 may be measured in inches, centimeters, and/or any other unit of measurement. When the clearance 206 is determined to not be less than the second threshold (e.g., the clearance 206 is too wide to maintain engine performance), the process moves forward to block 810. However, when the clearance 206 is determined to be less than the second threshold (e.g., the clearance 206 has been determined to not be too wide), the process moves to block 816.

At block 808, in response to having determined at block 804 that the width of the clearance 206 is less than the first threshold (e.g., the clearance 206 is too narrow to prevent blade tip rub), the second controller 408B sends an activation signal to the second spring actuator (e.g., second spring 406B of FIG. 4). In examples disclosed herein, the activation signal may cause the second spring 406B to decompress by facilitating an increase in ambient temperature (e.g., through a signal to a power supply, use of hot bleed air, etc.), causing the second spring 406B to reach an Austenitic state. In some examples, an additional deactivation signal may be sent by the first controller 408A to the first spring actuator (e.g., first spring 406A of FIG. 4). In these examples, the deactivation signal may cause the first spring 406A to compress by facilitating a simultaneous decrease in ambient temperature (e.g., through disconnection of the power supply, redirection and/or shutdown of use of hot bleed air, etc.), causing the first spring 406A to reach a Martensitic state. As the second spring 406B decompresses and the first spring 406A compresses, the example variable sleeve 202 of FIG. 2 shifts axially to the left, increasing the width of the clearance 206 between the fan case 402 and the fan blade 204 until the width satisfies the first threshold (e.g., the minimum threshold).

At block 810, in response to having determined at block 806 that the width of the clearance 206 is greater than the second threshold (e.g., the clearance 206 is too wide to maintain engine performance and/or efficiency), the first controller 408A sends an activation signal to the first spring actuator (e.g., first spring 406A of FIG. 4). In examples disclosed herein, the activation signal may cause the first spring 406A to decompress by facilitating an increase in ambient temperature (e.g., through a signal to a power supply, use of hot bleed air, etc.), causing the first spring 406A to reach an Austenitic state. In some examples, an additional deactivation signal may be sent by the second controller 408B to the second spring actuator (e.g., second spring 406B of FIG. 4). In these examples, the deactivation signal may cause the second spring 406B to compress by facilitating a simultaneous decrease in ambient temperature (e.g., through disconnection of the power supply, redirection and/or shutdown of use of hot bleed air, etc.), causing the second spring 406B to reach a Martensitic state. As the first spring 406A decompresses and the second spring 406B compresses, the example variable sleeve 202 of FIG. 2 shifts axially to the right, decreasing the width of the clearance 206 between the fan case 402 and the fan blade 204 until the width satisfies the second threshold (e.g., the maximum threshold).

At block 812, in response to activation (e.g., decompression) of the first spring 406A by the processor circuitry 1012 and/or the first controller 408A at block 810, the variable sleeve 202 shifts in an axial direction (e.g., to the right along an axis parallel to the fan case 402), as illustrated further in conjunction with FIG. 2, to narrow the width of the clearance 206. In examples disclosed herein, decompression of the first spring 406A causes the variable sleeve 202 to be drawn towards the second spring 406B.

At block 814, in response to activation (e.g., decompression) of the second spring 406B by the processor circuitry 1012 and/or the second controller 408B at block 808, the variable sleeve 202 shifts in an axial direction (e.g., to the left along an axis parallel to the fan case 402), as illustrated further in conjunction with FIG. 2, to widen the width of the clearance 206. In examples disclosed herein, decompression of the second spring 406B causes the variable sleeve 202 to be drawn towards the first spring 406A.

At block 816, in response to the processor circuitry 1012 and/or first and/or second controllers 408A, 408B having determined that the measured width of the clearance 206 falls within the range of a minimum threshold and maximum threshold (e.g., the first and second thresholds), the sleeve (e.g., variable sleeve 202 and/or locking sleeve 604 of FIG. 6) is locked in place to neither narrow nor widen the clearance 206. In examples disclosed herein, the locking sleeve 604 is locked into place by the protrusion 608 and complementary detent 602, which prevents the sleeve from moving in one or both axial directions. For example, if the detent 602 is positioned to the left of the locking sleeve 604 along an axial direction, the locking sleeve 604 would be unable to move past the detent 602 in that direction (e.g., to the left), regardless of compression and/or decompression of the first and/or second springs 406A and 406B. The locking sleeve 604, however, would be able to move to the right of the detent 602 in response to compression and/or decompression of the first and/or second springs 406A and 406B. Similarly, if the detent 602 is positioned to the right of the locking sleeve 604 along an axial line, the locking sleeve 604 would be unable to move past the detent 602 in that direction (e.g., to the right), regardless of compression and/or decompression of the first and/or second springs 406A and 406B. The locking sleeve 604, however, would be able to move to the left of the detent 602 in response to compression and/or decompression of the first and/or second springs 406A and 406B in this example.

Figure 9:
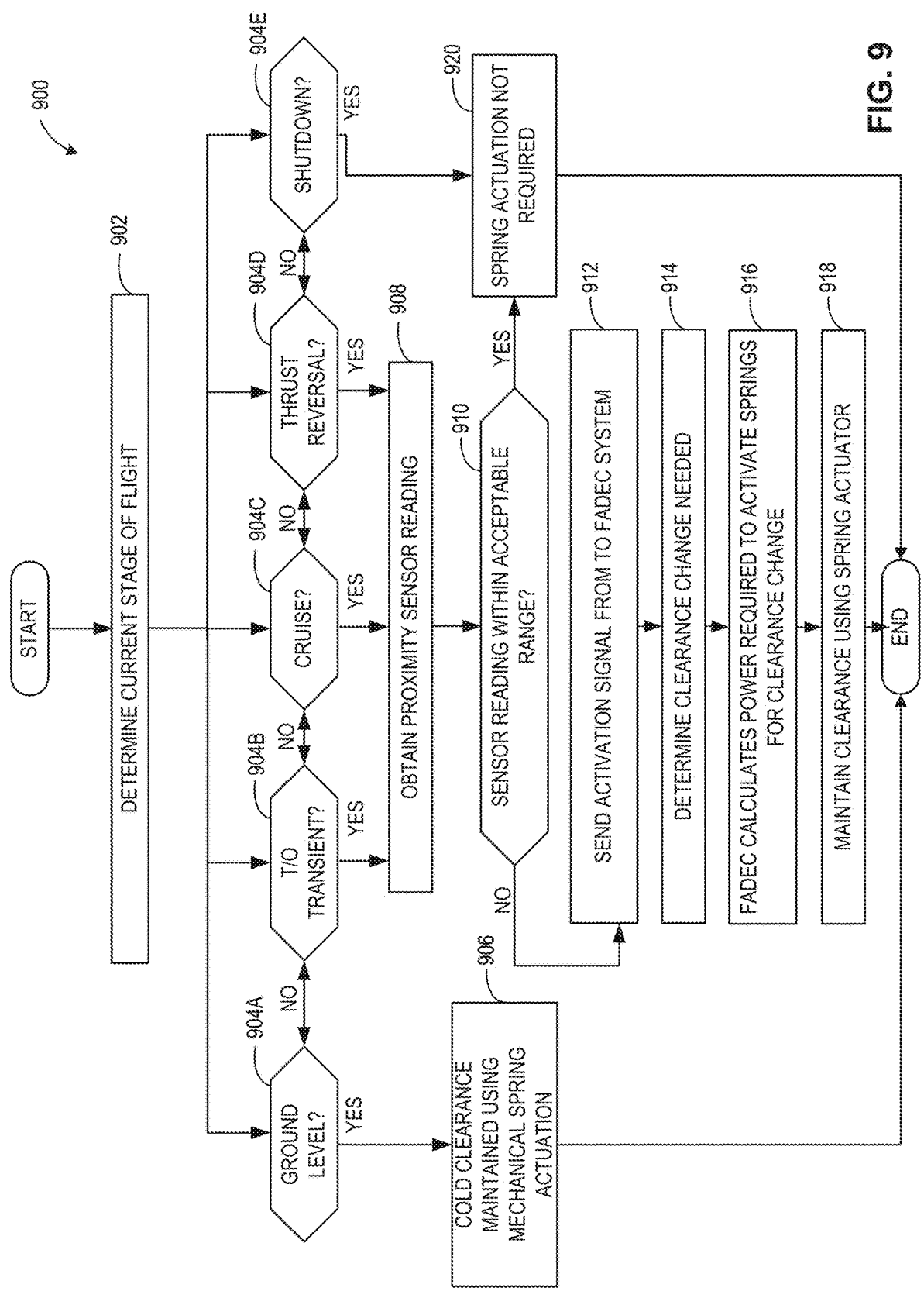
FIG. 9 is a flowchart representing machine-readable instructions to execute the example variable sleeve clearance control system of FIG. 2.

FIG. 9 is a flowchart representative of example machine readable instructions and/or example operations 900 that may be executed and/or instantiated by processor circuitry to provide a response to mitigate blade tip loss and/or optimize engine performance, based on a determined current flight condition (e.g., stage of flight), as performed by the example of FIG. 2. The machine readable instructions and/or the operations 900 of FIG. 9 begin at block 902, at which the processor circuitry 1012 and/or first and/or second controllers 408A, 408B of FIG. 4 shown in the example processor platform 1000 discussed below in connection with FIG. 10 causes the proximity sensors to detect the width of the clearance 206 of FIG. 2.

As illustrated in FIG. 9, at block 902, the first and/or second controllers 408A, 408B determine the current stage of flight. In examples disclosed herein, the stages of flight may include an aircraft stationed at ground level, an aircraft in takeoff/transient aircraft, cruise, thrust reversal, and/or shutdown.

At block 904A, the first and/or second controllers 408A, 408B check whether the aircraft is at ground level (e.g., ground level stage of flight). When the processor circuitry 1012 determines that the aircraft is indeed at ground level, the process moves to block 906. However, when the processor circuitry 1012 determines that the aircraft is not at ground level, the process may move to any one of blocks 904B, 904C, 904D, and/or 904E.

At block 904B, the first and/or second controllers 408A, 408B check whether the aircraft is in takeoff or is transient (e.g., takeoff/transient stage of flight). When the processor circuitry 1012 determines that the aircraft is in takeoff or is transient, the process moves to block 908. However, when the processor circuitry 1012 determines that the aircraft is not in takeoff and is not transient, the process may move to any one of blocks 904A, 904C, 904D, and/or 904E.

At block 904C, the first and/or second controllers 408A, 408B check whether the aircraft is in cruise (e.g., cruise stage of flight). When the processor circuitry 1012 determines that the aircraft is in cruise, the process moves forward to block 908. However, when the processor circuitry 1012 determines that the aircraft is not in cruise, the process may move to any one of blocks 904A, 904B, 904D, and/or 904E.

At block 904D, the first and/or second controllers 408A, 408B check whether the aircraft is in thrust reversal (e.g., thrust reversal stage of flight). When the processor circuitry 1012 determines that the aircraft is in thrust reversal, the process moves forward to block 908. However, when the processor circuitry 1012 determines that the aircraft is not in thrust reversal, the process may move to any one of blocks 904A, 904B, 904C, and/or 904E.

At block 904E, the first and/or second controllers 408A, 408B check whether the aircraft is in shutdown (e.g., shutdown stage of flight). When the processor circuitry 1012 determines that the aircraft is in shutdown, the process moves forward to block 920. However, when the processor circuitry 1012 determines that the aircraft is not in shutdown, the process may move to any one of block 904A, 904B, 904C, and/or 904D.

At block 906, upon determination by the first and/or second controllers 408A, 408B at block 904A that the current stage of flight is ground level, cold clearance is maintained using mechanical spring actuation. In examples disclosed herein, cold clearance refers to a state in which a magnetic field and/or power supply is not in activation, but rather, the springs (e.g., first spring 406A and/or second spring 406B of FIG. 4) are used to mechanically-maintain clearance width (e.g., using the detent 602 and the locking sleeve 604 of FIG. 6). In examples disclosed herein, clearance width is maintained by engaging the detent 602 with the protrusion 608 of the locking sleeve 604 of FIG. 6. As described in conjunction with FIG. 6, the detent 602 precludes the locking sleeve 604 from moving in an axial direction.

At block 908, upon determination by the first and/or second controllers 408A, 408B at block 904B that the current stage of flight is takeoff/transient, the processor circuitry 1012 and/or first and/or second controllers 408A, 408B obtains a reading from the example proximity sensor 410 of FIG. 4. In examples disclosed herein, this proximity sensor reading may indicate a width of the example clearance 206 of FIG. 2 (e.g., 0.010 inches, 0.005 centimeters, etc.).

At block 910, first and/or second controllers 408A, 408B determine whether the sensor reading obtained in block 908 falls within an acceptable range. In examples disclosed herein, the acceptable range may be marked by an example minimum threshold (e.g., 0.005 inches, 0.006 inches, 0.007 centimeters, 0.008 centimeters) and an example maximum threshold (e.g., 0.010 inches, 0.011 inches, 0.012 centimeters, 0.013 centimeters), indicating an example minimum and/or maximum width of the clearance 206 that is acceptable to mitigate blade tip loss and/or optimize engine performance. In examples disclosed herein, the minimum and maximum thresholds may be pre-determined values. Additionally, in examples disclosed herein, the first and/or second controllers 408A, 408B of FIG. 4 may be used to drive proximity sensor readings and/or the resulting transmission of signal for activation and/or deactivation of the set of springs (e.g., first spring 406A and second spring 406B).

At block 912, a signal is sent by the processor circuitry 1012 and/or first and/or second controllers 408A, 408B to activate spring actuation. In examples disclosed herein, the signal is sent to the Full Authority Digital Engine Control (FADEC) of the aircraft, which controls a power supply from which current can be sent for thermal activation of the first and/or second springs, 406A and/or 406B, respectively (e.g., through an increase in ambient temperature).

At block 914, the processor circuitry 1012 and/or first and/or second controllers 408A, 408B determines the change in clearance needed for the clearance width to fall within the acceptable range of block 910. For example, the processor circuitry 1012 and/or first and/or second controllers, 408A and 408B, respectively, may determine a difference in value between the reading of the proximity sensor 410 obtained in block 908 and at least one of the minimum and/or maximum thresholds that indicate the acceptable range of values for the clearance width.

At block 916, the processor circuitry 1012 and/or FADEC calculates the amount of power required to activate one or more of the first or second controllers, 408A or 408B, respectively to shift the variable sleeve (e.g., axially, radially, etc.) based on the required change in clearance calculated in block 914. Once calculated, the current is supplied by FADEC to the example variable sleeve clearance control system 200 of FIG. 2 in order to thermally activate and/or deactivate any combination of the first and/or second springs, 406A and/or 406B, respectively to widen and/or narrow the clearance (e.g., clearance 206), based on the teachings of this disclosure.

At block 918, the clearance 206 is maintained (e.g., the clearance 206 is actively adjusted in response to readings of the proximity sensor 410) through use of the first and second springs, 406A and 406B, respectively, the first and/or second controllers 408A, 408B, the variable sleeve 202, and thermal activation and/or deactivation (e.g., the process of blocks 908-916 is repeated).

At block 920, upon determination by the processor circuitry 1012 that the current stage of flight is shutdown, the processor circuitry 1012 establishes that no clearance adjustment through spring actuation is necessary.

Figure 10:
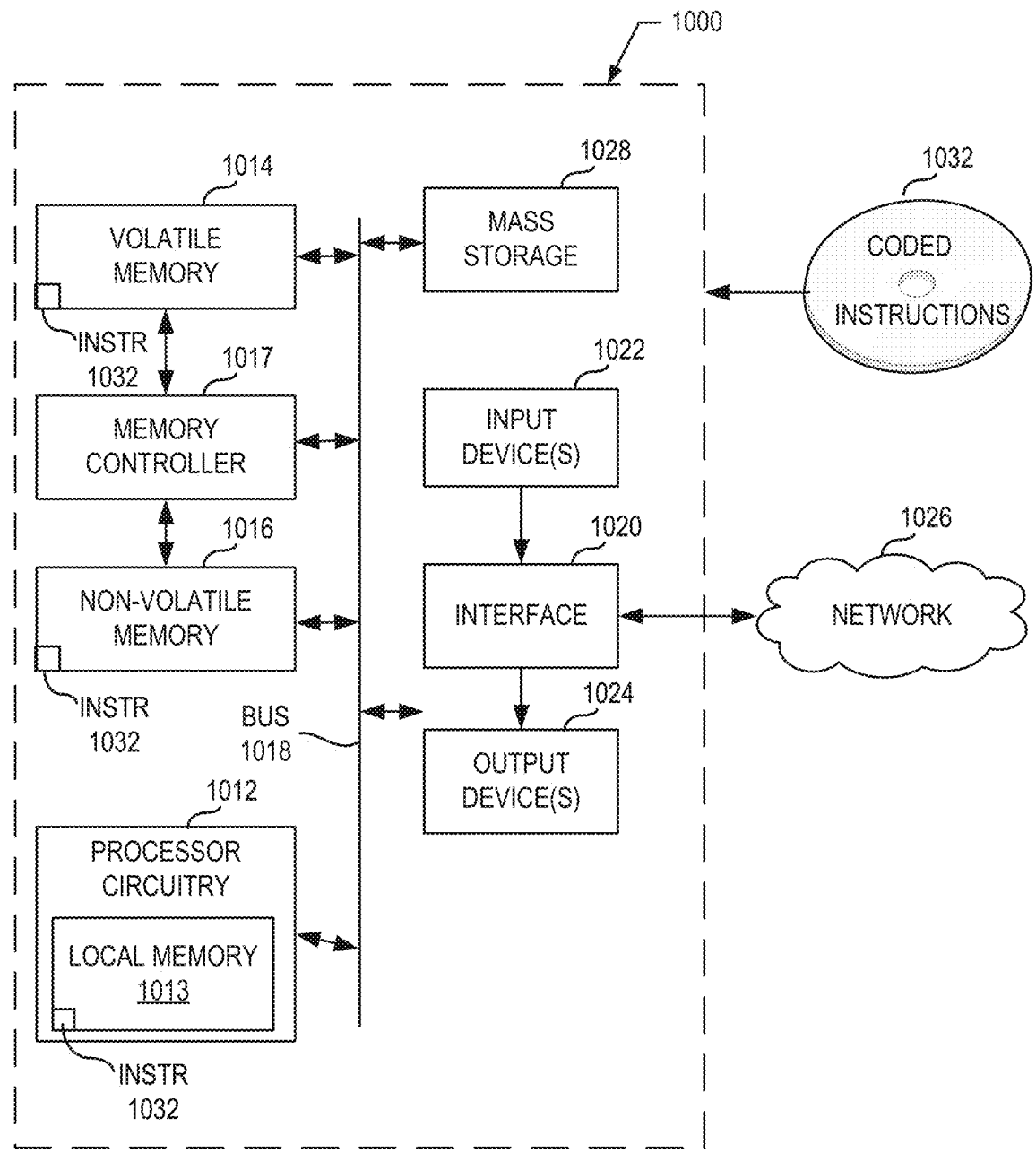
FIG. 10 is a block diagram of an example processing platform including processor circuitry structured to execute the example machine readable instructions and/or the example operations of FIGS. 8 and/or 9 to implement the example variable sleeve clearance control system of FIG. 2 and/or the example locking sleeve clearance control system of FIG. 6.

FIG. 10 is a block diagram of an example processor platform 1000 structured to execute and/or instantiate the machine readable instructions and/or the operations of FIGS. 8-9 to implement the example variable sleeve clearance control system 200 of FIG. 2 and the locking sleeve clearance control system 600 of FIG. 6. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry 1012 may be implemented by one or more semiconductor based (e.g., silicon based) devices.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012.

One or more output devices 1024 are also connected to the interface circuitry 1020 of the illustrated example. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1032, which may be implemented by the machine readable instructions of FIGS. 8-9, may be stored in the mass storage device 1028, in the volatile memory 1014, in the non-volatile memory 1016, and/or on a removable non-transitory computer readable storage medium such as a CD or DVD.

Examples disclosed herein include variable sleeve clearance control systems. The examples disclosed herein mitigate rotor blade tip loss and/or optimize engine performance by employing a dynamic clearance widening and/or narrowing response to blade tip expansion and/or retraction during changing flight conditions. The importance of this clearance control system is illustrated, for example, by preventing blade tip loss when a rotor blade rubs against the fan casing. The sleeve, in conjunction with abradable materials, compression and/or leaf springs, controllers, and/or proximity sensors, allows for the dynamic mitigation of blade tip loss as flight conditions change, and acts an active clearance control system. Furthermore, the sleeve is configured to have a variable angle such that when actuated (e.g., by the controllers) in response to a determination (e.g., by the proximity sensors) that the clearance has widened beyond a measure that would negatively affect overall engine performance and/or efficiency, the sleeve effectively narrows the clearance to improve engine performance. Examples disclosed can reduce the cost of continual replacement of rotor blades of gas turbine engines by reducing significant contact between the rotor blades and fan casing and can improve engine performance and reduce related fuel, energy, etc. costs by not allowing heat and/or air to escape through a wide gap.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Further aspects of the present disclosure are provided by the subject matter of the following clauses:

Example 1 includes A variable sleeve clearance control system for a gas turbine engine comprising a sleeve to manage clearance between a fan casing and a fan blade, a first end of the sleeve coupled to a first spring, the first spring to draw the sleeve inward upon compression, and a second end of the sleeve coupled to a second spring, the second spring to draw the sleeve outward upon compression, a proximity sensor coupled to a bottom of the sleeve, the proximity sensor to measure a clearance width, and a controller coupled to each of the first and second springs, the controller to obtain the measured clearance width.

Example 2 includes the variable sleeve clearance control system of any preceding clause, wherein the bottom of the sleeve is positioned at an angle relative to the fan blade.

Example 3 includes the variable sleeve clearance control system of any preceding clause, wherein the first and second springs are electromagnetically-actuated to compress and decompress through connection of a power supply by the controller.

Example 4 includes the variable sleeve control system of any preceding clause, wherein the response of the first and second springs is determined by comparing the measured clearance width to a maximum threshold, and wherein, in response to the measured clearance satisfying the maximum threshold, the controller is to actuate the first spring to compress and the second spring to decompress.

Example 5 includes the variable sleeve control system of any preceding clause, wherein the response is determined by comparing the measured clearance width to a minimum threshold, and wherein, in response to the measured clearance satisfying the minimum threshold, the controller is to actuate the second spring to compress and the first spring to decompress.

Example 6 includes the variable sleeve control system of any preceding clause wherein compression of the first spring and decompression of the second spring results in the sleeve moving linearly-inward, relative to the center of the gas turbine engine.

Example 7 includes the variable sleeve control system of any preceding clause, wherein compression of the second spring and decompression of the first spring results in the sleeve moving linearly-outward, relative to the center of the gas turbine engine.

Example 8 includes the variable sleeve control system of any preceding clause, wherein the sleeve has a first arm, the first arm to rest inside a first inlet of a fan case.

Example 9 includes the variable sleeve control system of any preceding clause, wherein the sleeve has a second arm, the second arm to rest inside a second inlet of a fan case.

Example 10 includes the variable sleeve control system of any preceding clause, wherein the sleeve further includes a protrusion configured to lock into place upon contact with a detent.

Example 11 includes the variable sleeve control system of any preceding clause, wherein the protrusion and the detent are complementary shapes.

Example 12 includes a gas turbine comprising a sleeve to manage clearance between a fan casing and a fan blade, a first end of the sleeve coupled to a first spring, the first spring to draw the sleeve inward upon compression, and a second end of the sleeve coupled to a second spring, the second spring to draw the sleeve outward upon compression, a proximity sensor coupled to a bottom of the sleeve, the proximity sensor to measure a clearance width, and a controller coupled to each of the first and second springs, the controller to obtain the measured clearance width from the proximity sensor and determine a response of the first and second springs.

Example 13 includes the apparatus of any preceding clause, wherein the bottom of the sleeve is positioned at an angle relative to the fan blade.

Example 14 includes the apparatus of any preceding clause wherein the first and second springs are electromagnetically-actuated to compress and decompress through connection of a power supply by the controller.

Example 15 includes the apparatus of any preceding clause, wherein the response of the first and second springs is determined by comparing the measured clearance width to a maximum threshold, and in response to the measured clearance satisfying the maximum threshold, the controller is to actuate the first spring to compress and the second spring to decompress.

Example 16 includes the apparatus of any preceding clause, wherein the response is determined by comparing the measured clearance width to a minimum threshold, and in response to the measured clearance satisfying the minimum threshold, the controller is to actuate the second spring to compress and the first spring to decompress.

Example 17 includes the apparatus of any preceding clause, wherein compression of the first spring and decompression of the second spring results in the sleeve moving linearly-inward, relative to the center of the gas turbine engine.

Example 18 includes the apparatus of any preceding clause, wherein compression of the second spring and decompression of the first spring results in the sleeve moving linearly-outward, relative to the center of the gas turbine engine.

Example 19 includes the apparatus of any preceding clause, wherein the sleeve has a first arm, the first arm to rest inside a first inlet of a fan case.

Example 20 includes the apparatus of any preceding clause, wherein the sleeve has a second arm, the second arm to rest inside a second inlet of a fan case.

Example 21 includes the apparatus of any preceding clause, wherein the sleeve further includes a protrusion configured to lock into place upon contact with a detent.

Example 22 includes the apparatus of any preceding clause, wherein the protrusion and the detent are complementary shapes.

Example 23 includes a method comprising: detecting a clearance width; determining whether the detected clearance width satisfies a minimum threshold; determining whether the detected clearance satisfies a maximum threshold; in response to determining that the detected clearance does not satisfy the minimum threshold, sending an activation signal to a second spring actuator; in response to determining that the detected clearance does not satisfy the maximum threshold, sending an activation signal to a first spring actuator; in response to actuation by the first spring actuator, moving a variable sleeve axially to the right; in response to actuation by second spring actuator, moving the variable sleeve axially to the left; and in response to determining that the detected clearance satisfies both the minimum threshold and the maximum threshold, locking the variable sleeve in place.

Example 24 includes a method comprising: determining a current stage of flight; in response to determining the current stage of flight is ground level maintaining cold clearance using mechanical spring actuation; in response to determining the current stage of flight is shutdown, not performing spring actuation; obtaining a reading from a proximity sensor; determining whether the obtained reading falls within an acceptable range of values; in response to determining the obtained reading does not fall within the acceptable range of values, sending an activation signal to a power supply (e.g., FADEC system); determining a change in clearance needed; calculating an amount of power required to activate one or more of a first or second spring to; and maintaining an acceptable clearance through activation of at least one of the first or second springs.

Example 25 includes memory circuitry, processor circuitry, and instructions to implement the method of any preceding clause.

Example 26 includes a controller to implement the method of any preceding clause.

The following claims are hereby incorporated into this Detailed Description by this reference, with each claim standing on its own as a separate embodiment of the present disclosure.

What is claimed is:

1. A variable sleeve clearance control system for a gas turbine engine comprising:
    a sleeve including a first end, a second end, and a bottom disposed between the first end and the second end, the first end of the sleeve coupled to a first spring that biases the sleeve inward, and the second end of the sleeve coupled to a second spring that biases the sleeve outward, the first and second springs oriented to apply a force in an axial direction;
    a proximity sensor to measure a clearance width;
    a first controller coupled to the first spring, the first controller to obtain the measured clearance width from the proximity sensor and determine a response of the first spring; and
    a second controller coupled to the second spring, the second controller to obtain the measured clearance width from the proximity sensor and determine a response of the second spring.

2. The variable sleeve clearance control system of claim 1, wherein the bottom of the sleeve is positioned at an angle relative to a fan blade of the gas turbine engine.

3. The variable sleeve clearance control system of claim 1, wherein the first and second springs are thermally-actuated to compress and decompress through connection of a power supply by the first and second controllers.

4. The variable sleeve clearance control system of claim 1, wherein the response of the first and second springs is determined by comparing the measured clearance width to a maximum threshold, and wherein, in response to the measured clearance width satisfying the maximum threshold, the first controller is to actuate the first spring to compress and the second controller is to actuate the second spring to decompress.

5. The variable sleeve clearance control system of claim 4, wherein compression of the first spring and decompression of the second spring results in the sleeve moving linearly outward, relative to a center of the gas turbine engine.

6. The variable sleeve clearance control system of claim 1, wherein the response is determined by comparing the measured clearance width to a minimum threshold, and wherein, in response to the measured clearance width satisfying the minimum threshold, the second controller is to actuate the second spring to compress and the first controller is to actuate the first spring to decompress.

7. The variable sleeve clearance control system of claim 6, wherein compression of the second spring and decompression of the first spring results in the sleeve moving linearly inward, relative to a center of the gas turbine engine.

8. The variable sleeve clearance control system of claim 1, wherein the sleeve has a first arm disposed inside a first inlet of a fan case.

9. The variable sleeve clearance control system of claim 8, wherein the sleeve has a second arm disposed inside a second inlet of the fan case.

10. The variable sleeve clearance control system of claim 1, wherein the sleeve further includes a protrusion to lock into place upon contact with a detent.

11. The variable sleeve clearance control system of claim 10, wherein the protrusion and the detent are complementary shapes.

12. A gas turbine engine, comprising:
    a fan blade;
    a fan case;
    a sleeve disposed between the fan blade and the fan case, the sleeve including a first end, a second end, and a bottom disposed between the first end and the second end, the first end of the sleeve coupled to a first spring that biases the sleeve inward, and the second end of the sleeve coupled to a second spring that biases the sleeve outward;
    a proximity sensor to measure a clearance width;
    a first controller for the first spring, the first controller to obtain the measured clearance width from the proximity sensor and determine a response of the first spring; and a second controller for the second spring, the second controller to obtain the measured clearance width from the proximity sensor and determine a response of the second spring.

13. The gas turbine engine of claim 12, wherein the bottom of the sleeve is positioned at an angle relative to the fan blade.

14. The gas turbine engine of claim 12, wherein the response of the first and second springs is determined by comparing the measured clearance width to a maximum threshold, and in response to the measured clearance width satisfying the maximum threshold, the first controller is to actuate the first spring to compress and the second controller is to actuate the second spring to decompress.

15. The gas turbine engine of claim 14, wherein compression of the first spring and decompression of the second spring results in the sleeve moving linearly outward, relative to a center of the gas turbine engine.

16. The gas turbine engine of claim 12, wherein the response is determined by comparing the measured clearance width to a minimum threshold, and in response to the measured clearance width satisfying the minimum threshold, the second controller is to actuate the second spring to compress and the first controller is to actuate the first spring to decompress.

17. The gas turbine engine of claim 16, wherein compression of the second spring and decompression of the first spring results in the sleeve moving linearly inward, relative to a center of the gas turbine engine.

18. The gas turbine engine of claim 12, wherein the sleeve has a first arm, the first arm to rest inside a first inlet of the fan case.

19. The gas turbine engine of claim 12, wherein the sleeve has a second arm, the second arm to rest inside a second inlet of the fan case.

* * * * *